United States Patent
Subbaiah (10) Patent No.: US 11,888,695 B1
(45) Date of Patent: Jan. 30, 2024

(54) CONFIRMED COMMIT WITH USER SPECIFIED AUTOMATIC ROLLBACK CONFIGURATION

(71) Applicant: Juniper Networks, Inc., Sunnyvale, CA (US)

(72) Inventor: Polisetty Rama Subbaiah, Banaglore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/186,689

(22) Filed: Mar. 20, 2023

(51) Int. Cl.
*H04L 41/0894* (2022.01)
*H04L 41/08* (2022.01)

(52) U.S. Cl.
CPC ...... *H04L 41/0894* (2022.05); *H04L 41/0879* (2013.01)

(58) Field of Classification Search
None
See application file for complete search history.

(56) References Cited

U.S. PATENT DOCUMENTS

| | | | | |
|---|---|---|---|---|
| 7,493,376 B1 * | 2/2009 | Pulpatta | .............. | H04L 41/0686 707/999.103 |
| 7,523,097 B1 * | 4/2009 | Wilson | ................ | G06F 11/1469 |
| 7,640,317 B2 * | 12/2009 | Jain | ....................... | H04L 67/125 709/215 |
| 7,822,718 B1 | 10/2010 | Wilson et al. | | |
| 9,313,187 B1 * | 4/2016 | Huntwork | ........... | H04L 63/0281 |
| 10,747,576 B1 | 8/2020 | Yucel | | |
| 11,271,761 B2 * | 3/2022 | Åkesson | ............. | H04L 41/0893 |
| 11,750,354 B2 * | 9/2023 | Matsumura | ........... | H04L 5/0032 455/452.2 |

* cited by examiner

*Primary Examiner* — Atta Khan
(74) *Attorney, Agent, or Firm* — Harrity & Harrity, LLP (57) ABSTRACT

A network device receives a first message indicating that the network device is to operate according to a new configuration for a period of time and that the network device is to operate according to a user specified configuration upon expiration of the period of time without confirmation of the new configuration. The network device thereby causes the network device to operate according to the new configuration for the period of time, and then determines whether the network device received, prior to expiration of the period of time, confirmation of the new configuration. The network device selectively: causes the network device to operate according to the user specified configuration after expiration of the period of time, based on determining that confirmation was not received; or causes the network device to operate according to the new configuration after expiration of the period of time, based on determining confirmation was received.

20 Claims, 8 Drawing Sheets

CONFIRMED COMMIT WITH USER SPECIFIED AUTOMATIC ROLLBACK CONFIGURATION

BACKGROUND

A network operating system executing on a network device (e.g., a router, a switch, and/or a similar device) enables users to update a configuration of the network device via various user interfaces, such as a command line interface (CLI) and/or an extensible markup language (XML) remote procedure call (RPC) mechanism.

SUMMARY

In some implementations, a method includes receiving, by a network device, a new configuration, wherein the network device, when receiving the new configuration, operates according to an active configuration that is stored in a first data structure; storing, by the network device, the new configuration in a second data structure, wherein the second data structure includes a user specified configuration; receiving, by the network device, a first message indicating that the network device is to operate according to the new configuration for a period of time; causing, by the network device and based on the first message, the new configuration to be temporarily stored in the first data structure to cause the network device to operate according to the new configuration for the period of time; determining, by the network device and based on causing the new configuration to be stored in the first data structure, whether the network device received, prior to expiration of the period of time, a second message indicating confirmation of the new configuration; and selectively: causing, by the network device, the user specified configuration to be non-temporarily stored in the first data structure to cause the network device to operate according to the user specified configuration after expiration of the period of time, based on determining that the network device did not receive the second message prior to expiration of the period of time; or causing, by the network device, the new configuration to be non-temporarily stored in the first data structure to cause the network device to operate according to the new configuration after expiration of the period of time, based on determining that the network device received the second message prior to expiration of the period of time.

In some implementations, a network device includes one or more memories; and one or more processors to: receive a first message indicating that the network device is to operate according to a new configuration for a period of time and that the network device is to operate according to a user specified configuration upon expiration of the period of time without confirmation of the new configuration; cause, based on the first message, the new configuration to be temporarily stored in a first data structure to cause the network device to operate according to the new configuration for the period of time; determine, based on causing the new configuration to be stored in the first data structure, whether the network device received, prior to expiration of the period of time, a second message indicating confirmation of the new configuration; and selectively: cause the user specified configuration to be non-temporarily stored in the first data structure to cause the network device to operate according to the user specified configuration after expiration of the period of time, based on determining that the network device did not receive the second message prior to expiration of the period of time; or cause the new configuration to be non-temporarily stored in the first data structure to cause the network device to operate according to the new configuration after expiration of the period of time, based on determining that the network device received the second message prior to expiration of the period of time.

In some implementations, a non-transitory computer-readable medium storing a set of instructions includes one or more instructions that, when executed by one or more processors of a network device, cause the network device to: receive a first message indicating that the network device is to operate according to a new configuration for a period of time and that the network device is to operate according to another configuration upon expiration of the period of time without confirmation of the new configuration; cause, based on the first message, the network device to operate according to the new configuration for the period of time; determine, based on causing the network device to operate according to the new configuration for the period of time, whether the network device received, prior to expiration of the period of time, a second message indicating confirmation of the new configuration; and selectively: cause the network device to operate according to the other configuration after expiration of the period of time, based on determining that the network device did not receive the second message prior to expiration of the period of time; or cause the network device to operate according to the new configuration after expiration of the period of time, based on determining that the network device received the second message prior to expiration of the period of time.

DETAILED DESCRIPTION

The following detailed description of example implementations refers to the accompanying drawings. The same reference numbers in different drawings may identify the same or similar elements.

A network device (e.g., when operating according to a particular configuration) can be configured to operate according to a new configuration via a "confirmed commit" process. As part of the process, a "commit" message is sent to the network device to cause the network device to operate according to the new configuration for a period of time. If the network device does not receive a "confirmation" message before expiration of the period of time, the network device rolls back to operating according to the particular configuration (e.g., that was previously active). This allows a user (e.g., a system administrator) to test the new configuration of the network device during the period of time, and to prevent permanent installation of the new configuration on the network device without an explicit confirmation by the user.

However, automatically rolling back (e.g., when a confirmation message is not received) to the particular configuration (e.g., the previously active configuration) can lead to undesirable results. For example, when the particular configuration wastes computing resources (e.g., processing resources, memory resources, communication resources, and/or power resources, among other examples), the network device may automatically roll back to a configuration that causes the network device to operate in a non-optimal manner. This can impact a performance of the network device and/or other network devices associated with the network device (e.g., that are in a network with the network device).

Some implementations described herein provide a network device that supports confirmed commit with user specified automatic rollback configuration. For example, the network device may receive a message indicating that the network device is to operate according to a new configuration for a period of time and that the network device is operate according to another configuration (e.g., a user specified configuration, not an active configuration of the network device) upon expiration of the period of time without confirmation of the new configuration. The network device may therefore cause the network device to operate according to the new configuration for the period of time (e.g., by storing the new configuration in a running configuration data structure), and may cause, based on determining that the network device did not receive confirmation of the new configuration prior to expiration of the period of time, the network device to operate according to the other configuration (according to the user specified configuration, and not according to the previously active configuration) after expiration of the period of time (e.g., by storing the other configuration in the running configuration data structure).

In this way, when the new configuration is not confirmed, the network device is configured to automatically roll back to operating according to a preferred configuration (rather than the previously active configuration), such as a user specified configuration. The preferred configuration may not, for example, waste computing resources and may therefore decrease a likelihood that the network device operates in a non-optimal manner. This improves (e.g., after expiration of the period of time) a performance of the network device and/or other network devices associated with the network device (e.g., that are in a network with the network device). In another example, the preferred configuration may be a known or understood configuration (e.g., a default configuration), which allows the network device to operate in a manner (e.g., according to the preferred configuration) that enables the network device to undergo testing or monitoring, such as to identify one or more issues associated with operation of the network device. This allows the one or more issues to be addressed (e.g., via a software change and/or hardware change to the network device), which leads to an improved performance of the network device.

FIGS. 1A-1D are diagrams of one or more example implementations 100 described herein. As shown in FIGS. 1A-1D, example implementation(s) 100 may include an endpoint device and one or more network devices (shown as network devices 1 through N, where N≥1). The endpoint device and the one or more network devices are described in more detail below in connection with FIGS. 2-4.

In some implementations, a network device (e.g., the left network device shown in FIGS. 1A-1D) may operate according to an active configuration. The active configuration may include one or more configuration settings, such as related to one or more interfaces of the network device, one or more security policies of the network device, and/or one or more routing protocols of the network device, among other examples.

The network device may have received the active configuration, such as from the endpoint device. For example, the network device may have received the active configuration via a user interface of the network device, such as a command line interface (CLI), a remote procedure call (RPC) mechanism (e.g., an extensible markup language (XML) RPC mechanism), and/or the like. Upon receiving the active configuration, the network device may have stored the active configuration in a candidate configuration data structure (e.g., a database, a file, or another type of data structure), which is also referred to as a candidate configuration datastore. The network device then may have caused the active configuration to be stored in a running configuration data structure, which is also referred to as a running configuration datastore. This allows the network device to operate according to the new configuration because the network device operates according to whichever configuration is currently stored in the running configuration data structure.

Figure 1A:
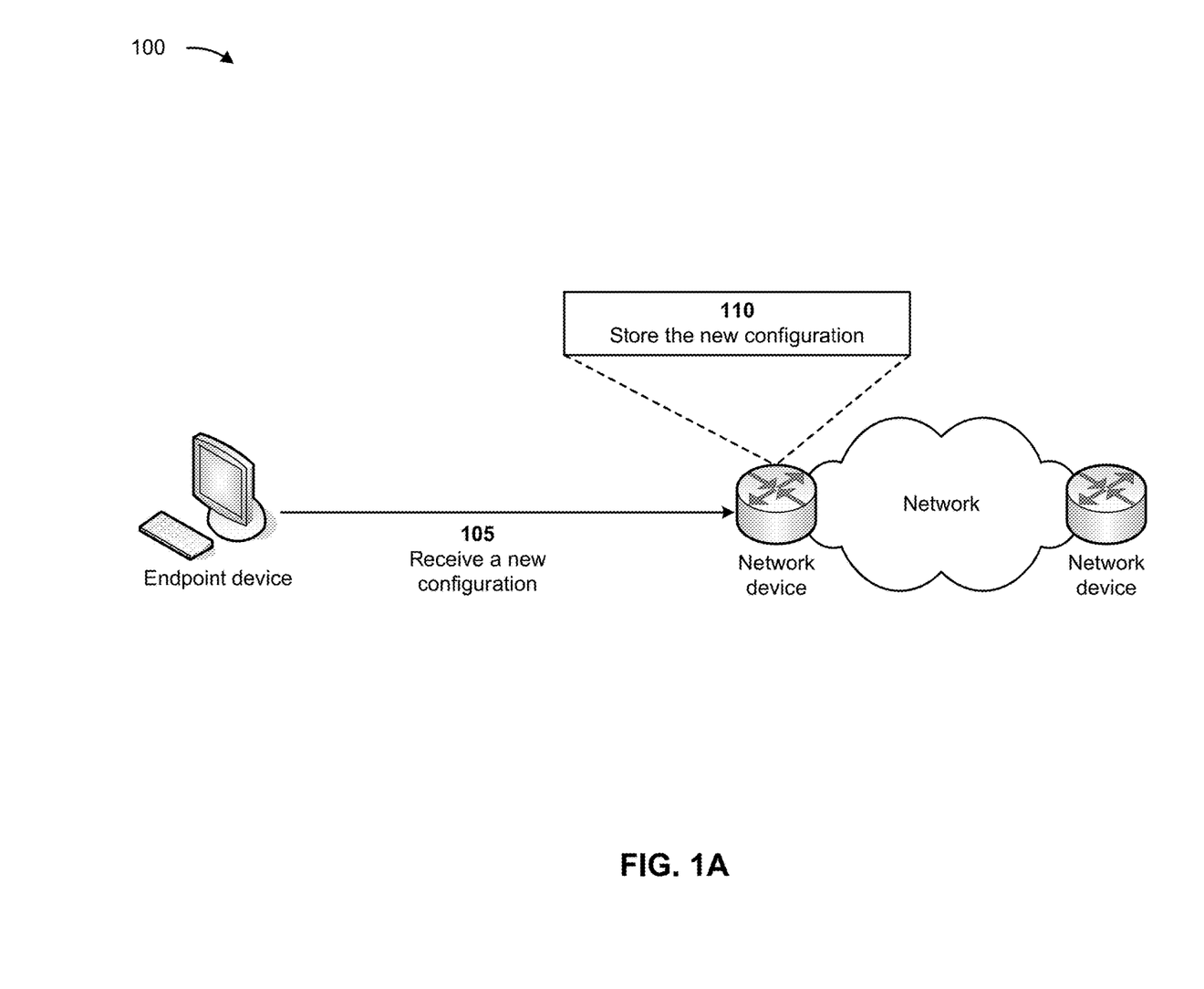
FIGS. 1A-1D are diagrams of one or more example implementations described herein.

As shown in FIG. 1A, and by reference number 105, the network device (e.g., when operating according to the active configuration) may receive a new configuration. For example, the endpoint device may provide the new configuration to the network device, and the network device may receive the new configuration from the endpoint device. In some implementations, the network device may receive the new configuration from another device (e.g., another network device, a server device, a network management system, or a similar device). In some implementations, the new configuration may be received by the network device via a user interface of the network device, such as the CLI, the RPC, or another interface. The new configuration may include one or more configuration settings and may be different than the active configuration (e.g., may include at least one configuration setting that is different than the one or more configuration settings of the active configuration).

As shown by reference number 110, the network device may store the new configuration. For example, the network device may store the new configuration in the candidate configuration data structure. This causes the candidate configuration data structure to therefore include the new configuration and the active configuration. In some implementations, the candidate configuration data structure may include one or more other configurations. The one or more other configurations are different than each of the new configuration and the active configuration.

Figure 1B:
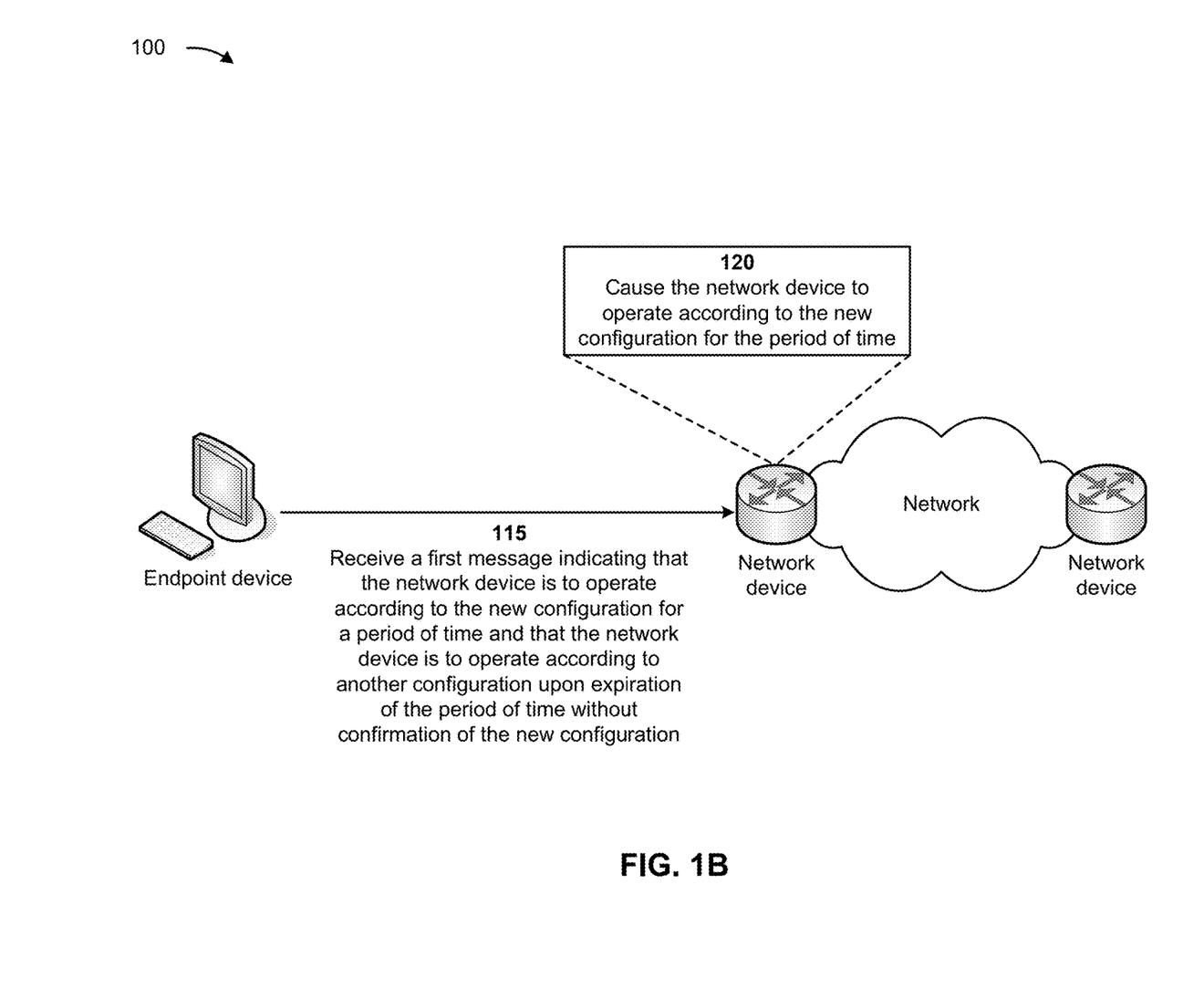

As shown in FIG. 1B, and by reference number 115, the network device may receive a first message. For example, the endpoint device may provide the first message to the network device, and the network device may receive the first message from the endpoint device. In some implementations, the network device may receive the first message from another device (e.g., another network device, a server device, a network management system, or a similar device). In some implementations, the first message may be received by the network device via a user interface of the network device, such as the CLI, the RPC, or another interface.

The first message may indicate that the network device is to operate according to the new configuration for a period of time (e.g., that is greater than or equal to 1 minute, 5 minutes, 10 minutes, 15 minutes, or 20 minutes, among other examples) and/or that the network device is to operate according to another configuration (e.g., of the one or more other configurations stored in the candidate configuration data structure) upon expiration of the period of time without confirmation of the new configuration. For example, the first message may include information identifying that the network device is to operate according to the new configuration; information identifying the period of time; and/or information identifying that the network device is to operate according to the other configuration upon expiration of the period of time (e.g., without confirmation of the new configuration). In a specific example, the first message may be a commit message and may include syntax such as "network device>commit new_configuration other_configuration timeout ten minutes." In this way, the other configuration may be a user specified configuration.

As shown by reference number 120, the network device may cause (e.g., based on the first message) the network device to operate according to the new configuration for the period of time. For example, the network device may cause the new configuration to be stored in the running configuration data structure. This may cause the active configuration to be removed from the running configuration data structure. Accordingly, because the new configuration (and not the active configuration) is stored in the running configuration data structure, the network device may operate according to the new configuration. In some implementations, the network device may cause the new configuration to be temporarily stored in the running configuration data structure for the period of time. That is, the network device may be configured to allow the new configuration to be stored in the running configuration data structure until expiration of the period of time, at which time the network device may cause the new configuration to be automatically removed from the running configuration (e.g., unless confirmation of the new configuration is received by the network device prior to expiration of the period of time, as described herein).

Figure 1C:
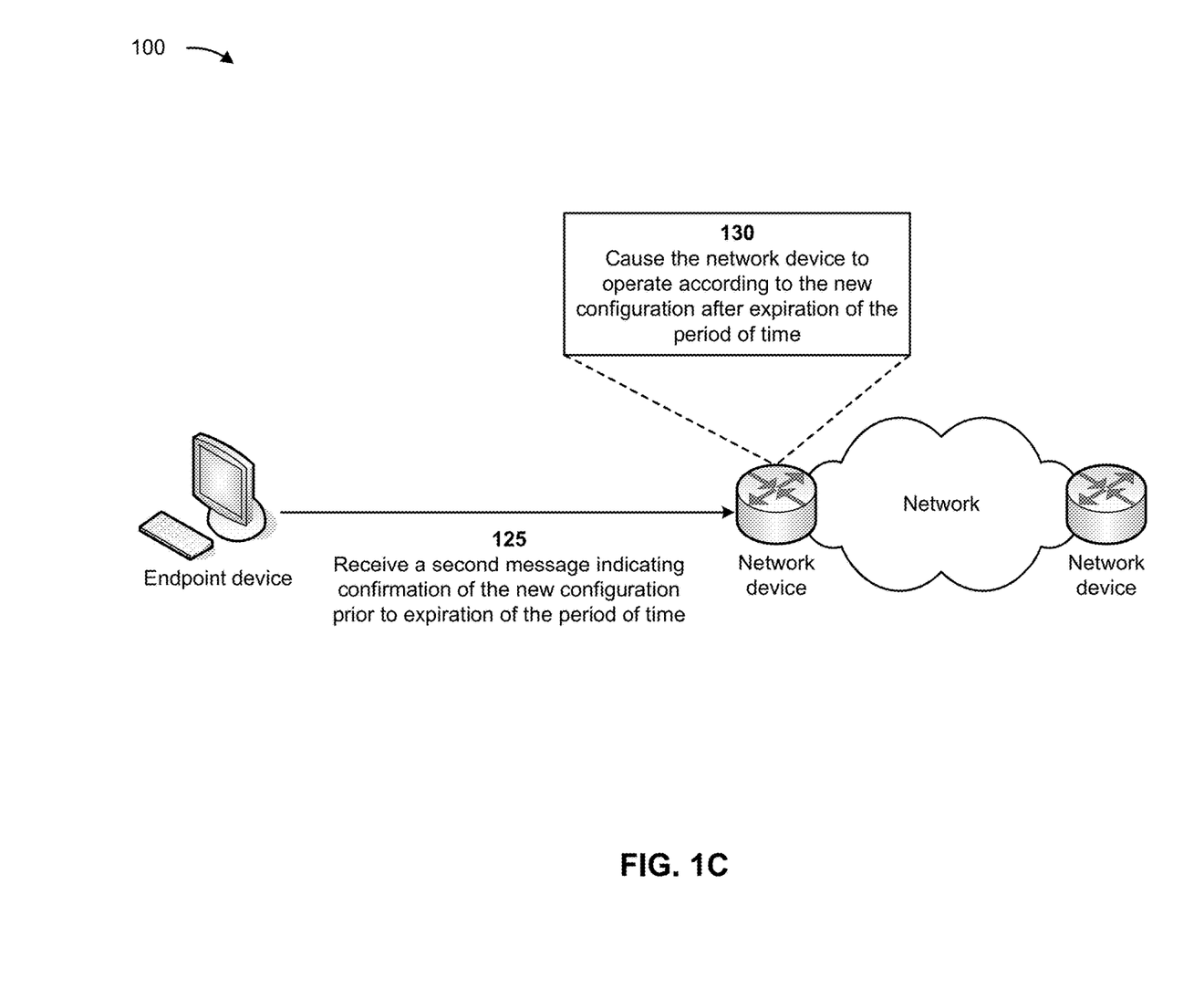

As shown in FIG. 1C, and by reference number 125, the network device may receive a second message. For example, the endpoint device may provide the second message to the network device, and the network device may receive the second message from the endpoint device. In some implementations, the network device may receive the second message from another device (e.g., another network device, a server device, a network management system, or a similar device). In some implementations, the second message may be received by the network device via a user interface of the network device, such as the CLI, the RPC, or another interface.

The second message may indicate confirmation of the new configuration. For example, the second message may include information indicating that a user (e.g., of the endpoint device) confirms that the network device is to continue operating according to the new configuration. In a specific example, the second message may be a confirm message and may include syntax such as "network device>confirm new_configuration."

In some implementations, the network device may determine whether the network device received the second message prior to expiration of the period of time. For example, the network device may determine that a time of reception of the second message occurred before, or at, an end time of the period of time (e.g., within the period of time), and the network device may therefore perform one or more processing steps described herein in relation to reference number 130. Alternatively, the network device may determine that the time of reception occurred after the end time of the period of time (e.g., after expiration of the period of time), and the network device may therefore perform one or more processing steps described herein in relation to FIG. 1D and reference number 140.

As shown by reference number 130, the network device may cause (e.g., based on determining that the network device received the second message prior to expiration of the period of time) the network device to operate according to the new configuration after expiration of the period of time. For example, the network device may cause the new configuration to be non-temporarily stored in the running configuration data structure after expiration of the period of time. That is, the network device may be configured to cause the new configuration to persist (e.g., to not be automatically removed) from the running configuration data structure, based on determining that the network device received the second message prior to expiration of the period of time.

Figure 1D:
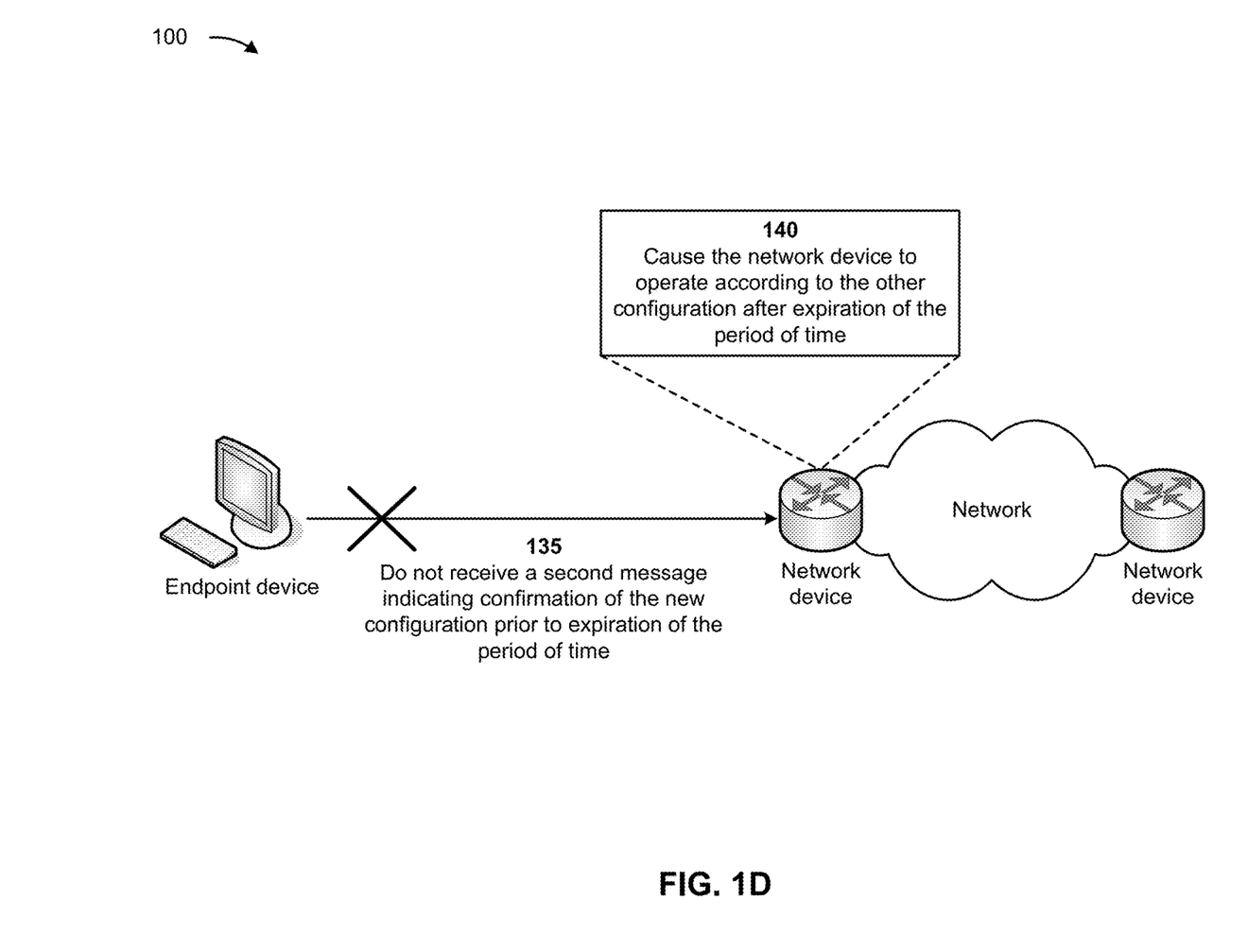

As shown in FIG. 1D, and by reference number 135, the network device may not receive the second message (e.g., prior to the expiration of the period of time). For example, the network device may receive the second message after expiration of the period of time, as described above. Alternatively, the network device may not receive the second message at all. That is, the endpoint device (or another device) may not provide the second message and therefore the network device may not receive the second message. Accordingly, the network device may determine that the network device did not receive the second message prior to expiration of the period of time, and may therefore perform one or more processing steps described herein in relation to reference number 140.

As shown by reference number 140, the network device may cause (e.g., based on determining that the network device did not receive the second message prior to expiration of the period of time) the network device to operate according to the other configuration (e.g., that is different than each of the new configuration and the active configuration) after expiration of the period of time. For example, the network device may cause the other configuration to be stored in the running configuration data structure. This may cause the new configuration to be removed from the running configuration data structure. Accordingly, because the other configuration (and not the new configuration) is stored in the running configuration data structure, the network device may operate according to the other configuration. In some implementations, the network device may cause the other configuration to be non-temporarily stored in the running configuration data structure after expiration of the period of time. That is, the network device may be configured to cause the other configuration to persist (e.g., to not be automatically removed) in the running configuration data structure after expiration of the period of time, based on determining that the network device did not receive the second message prior to expiration of the period of time. In this way, the network device may operate according to a user specified configuration.

As indicated above, FIGS. 1A-1D are provided merely as one or more examples. Other examples may differ from what is described with regard to FIGS. 1A-1D.

Figure 2:
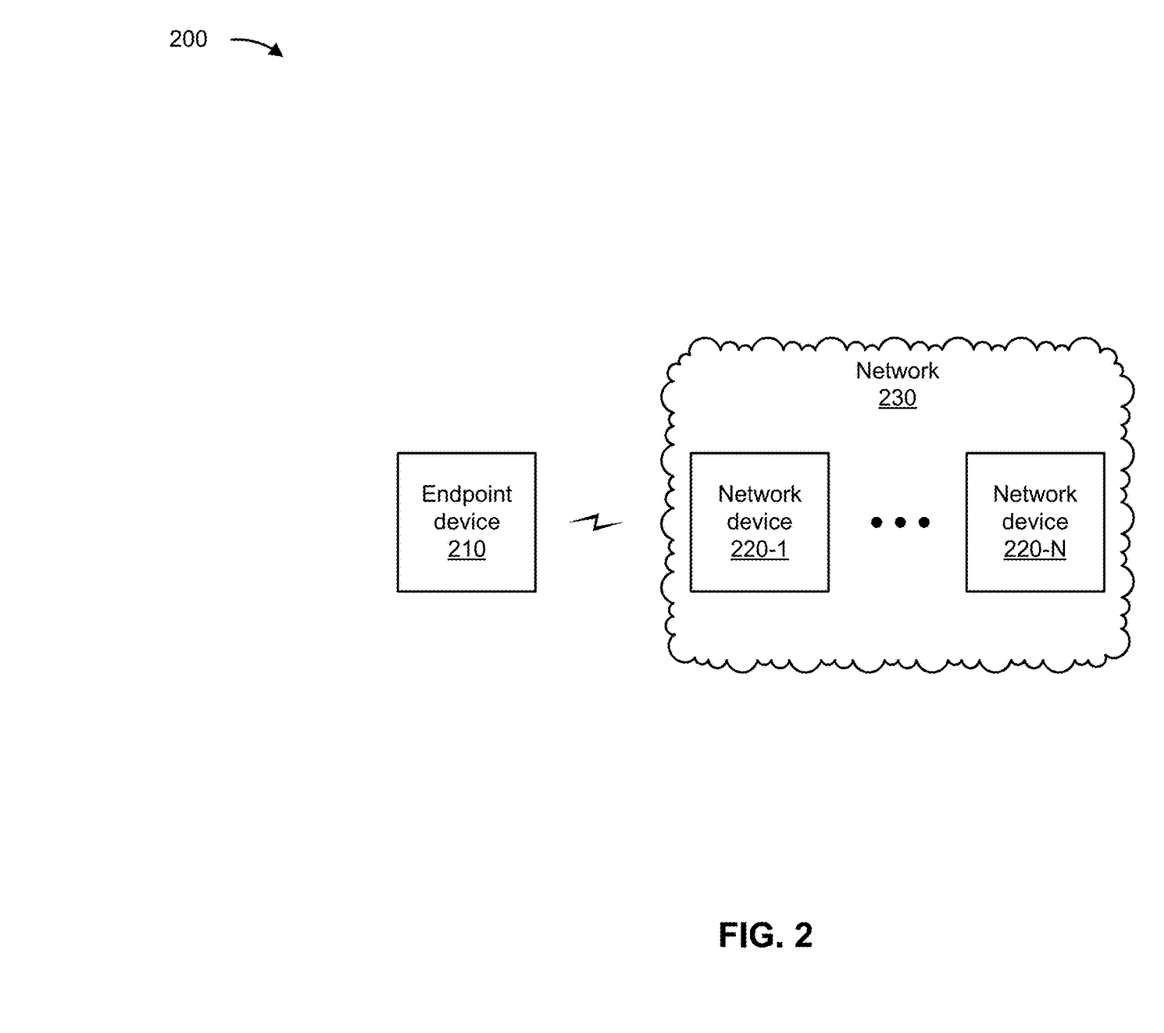
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
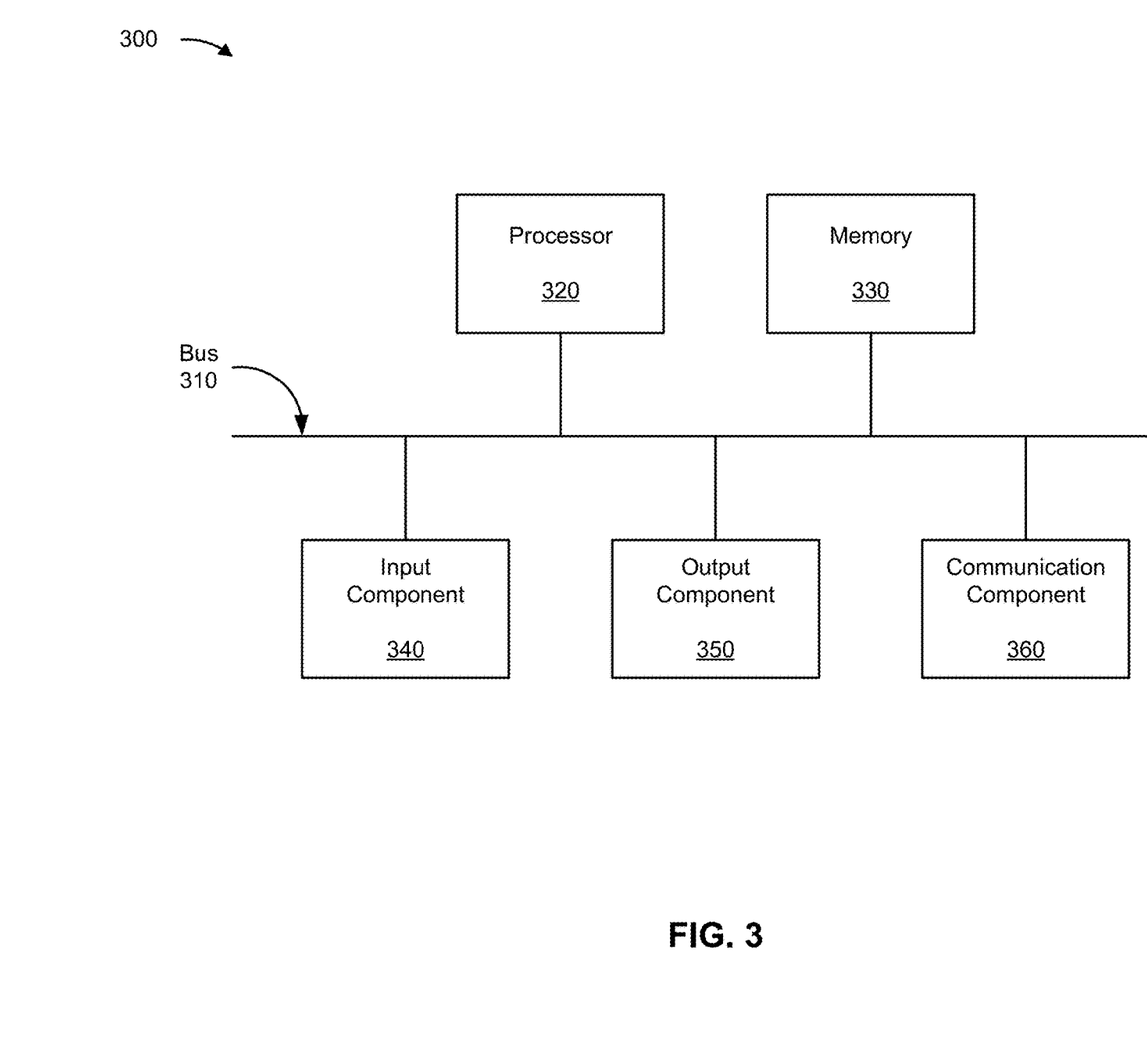
FIG. 3 is a diagram of example components of a device associated with user specified automatic rollback configuration of a network device.

FIG. 3 is a diagram of example components of a device 300 associated with user specified automatic rollback configuration of a network device. The device 300 may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
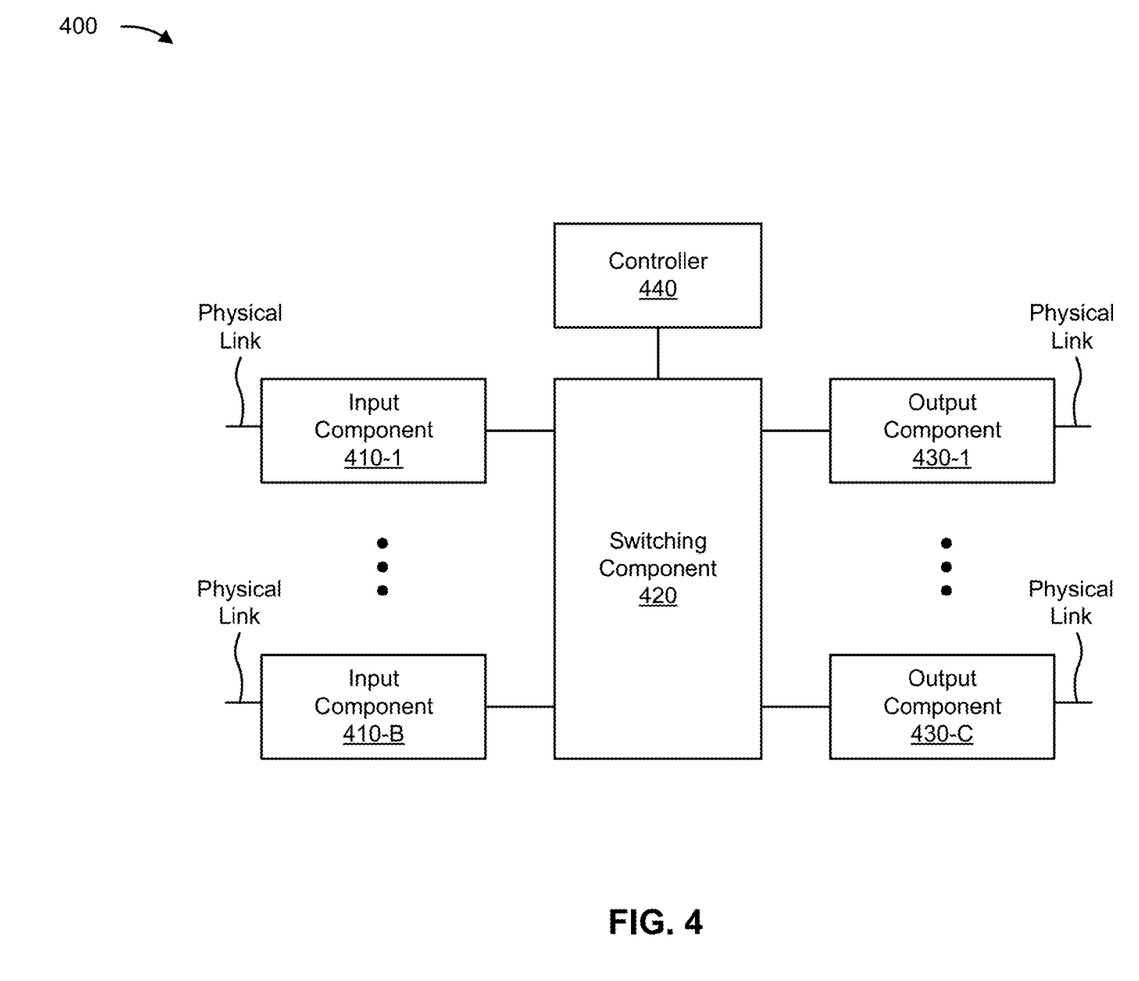
FIG. 4 is a diagram of example components of a device associated with user specified automatic rollback configuration of a network device.

FIG. 4 is a diagram of example components of a device 400 associated with user specified automatic rollback configuration of a network device. Device 400 may correspond to the endpoint device 210 and/or the network device 220. In some implementations, the endpoint device 210 and/or the network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
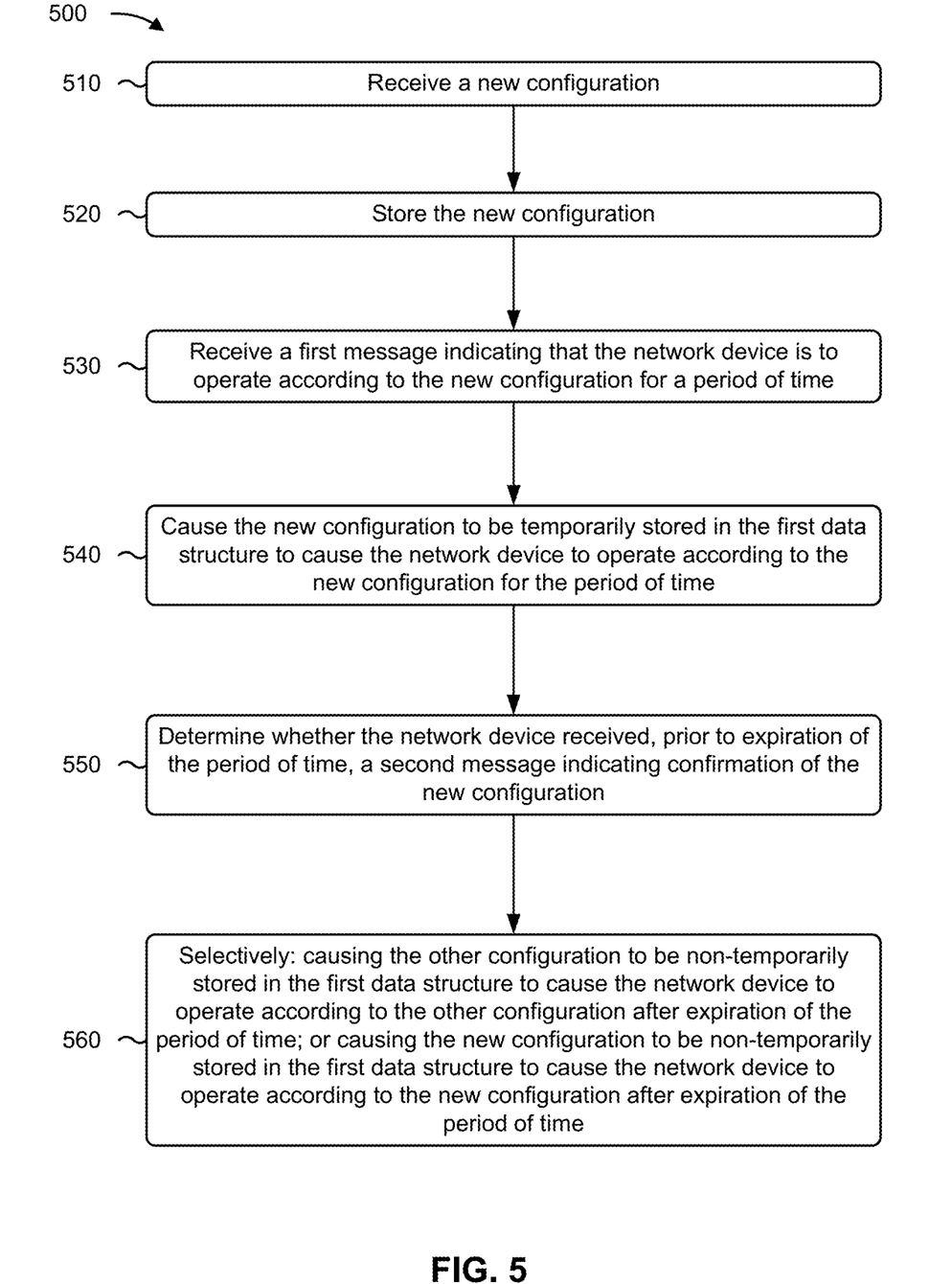
FIG. 5 is a flowchart of an example process associated with user specified automatic rollback configuration of a network device.

FIG. 5 is a flowchart of an example process 500 associated with user specified automatic rollback configuration of a network device. In some implementations, one or more process blocks of FIG. 5 are performed by a network device (e.g., the network device 220). In some implementations, one or more process blocks of FIG. 5 are performed by another device or a group of devices separate from or including the system, such as an endpoint device (e.g., the endpoint device 210). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more components of another device.

As shown in FIG. 5, process 500 may include receiving a new configuration (block 510). For example, the network device may receive a new configuration, as described above. In some implementations, the network device, when receiving the new configuration, operates according to an active configuration that is stored in a first data structure.

As further shown in FIG. 5, process 500 may include storing the new configuration (block 520). For example, the network device may store the new configuration in a second data structure, as described above. In some implementations, the second data structure includes a user specified configuration.

As further shown in FIG. 5, process 500 may include receiving a first message indicating that the network device is to operate according to the new configuration for a period of time (block 530). For example, the network device may receive a first message indicating that the network device is to operate according to the new configuration for a period of time, as described above.

As further shown in FIG. 5, process 500 may include causing the new configuration to be temporarily stored in the first data structure to cause the network device to operate according to the new configuration for the period of time (block 540). For example, the network device may cause, based on the first message, the new configuration to be temporarily stored in the first data structure to cause the network device to operate according to the new configuration for the period of time, as described above.

As further shown in FIG. 5, process 500 may include determining, whether the network device received, prior to expiration of the period of time, a second message indicating confirmation of the new configuration (block 550). For example, the network device may determine, based on causing the new configuration to be stored in the first data structure, whether the network device received, prior to expiration of the period of time, a second message indicating confirmation of the new configuration, as described above.

As further shown in FIG. 5, process 500 may include selectively: causing the user specified configuration to be non-temporarily stored in the first data structure to cause the network device to operate according to the user specified configuration after expiration of the period of time; or causing the new configuration to be non-temporarily stored in the first data structure to cause the network device to operate according to the new configuration after expiration of the period of time (block 560). For example, the network device may selectively: cause the user specified configuration to be non-temporarily stored in the first data structure to cause the network device to operate according to the user specified configuration after expiration of the period of time, based on determining that the network device did not receive the second message prior to expiration of the period of time; or cause the new configuration to be non-temporarily stored in the first data structure to cause the network device to operate according to the new configuration after expiration of the period of time, based on determining that the network device received the second message prior to expiration of the period of time, as described above.

Process 500 may include additional implementations, such as any single implementation or any combination of implementations described below and/or in connection with one or more other processes described elsewhere herein.

In a first implementation, the first data structure is a running configuration datastore of the network device and the second data structure is a candidate configuration datastore of the network device.

In a second implementation, the first message includes at least one of information identifying that the network device is to operate according to the new configuration, information identifying the period of time, or information identifying that the network device is to operate according to the user specified configuration upon expiration of the period of time without confirmation of the new configuration.

In a third implementation, causing the new configuration to be temporarily stored in the first data structure causes the active configuration to be removed from the first data structure.

In a fourth implementation, causing the user specified configuration to be non-temporarily stored in the first data structure causes the new configuration to be removed from the first data structure.

In a fifth implementation, causing the new configuration to be non-temporarily stored in the first data structure causes the new configuration to persist in the first data structure after expiration of the period of time.

In a sixth implementation, receiving the first message comprises receiving the first message via one of a command line interface or a remote procedure call mechanism.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a network device, a new configuration,
        wherein the network device, when receiving the new configuration, operates according to an active configuration that is stored in a first data structure;
    storing, by the network device, the new configuration in a second data structure,
        wherein the second data structure includes a user specified configuration;
    receiving, by the network device, a first message indicating that the network device is to operate according to the new configuration for a period of time,
        wherein the first message includes at least one of:
            information identifying that the network device is to operate according to the new configuration;
            information identifying the period of time; or
            information identifying that the network device is to operate according to the user specified configuration upon expiration of the period of time without confirmation of the new configuration;
    causing, by the network device and based on the first message, the new configuration to be temporarily stored in the first data structure to cause the network device to operate according to the new configuration for the period of time;
    determining, by the network device and based on causing the new configuration to be stored in the first data structure, whether the network device received, prior to expiration of the period of time, a second message indicating confirmation of the new configuration; and
    selectively:
        causing, by the network device, the user specified configuration to be non-temporarily stored in the first data structure to cause the network device to operate according to the user specified configuration after expiration of the period of time, based on determining that the network device did not receive the second message prior to expiration of the period of time; or
        causing, by the network device, the new configuration to be non-temporarily stored in the first data structure to cause the network device to operate according to the new configuration after expiration of the period of time, based on determining that the network device received the second message prior to expiration of the period of time.

2. The method of claim 1, wherein the first data structure is a running configuration datastore of the network device and the second data structure is a candidate configuration datastore of the network device.

3. The method of claim 1, wherein causing the new configuration to be temporarily stored in the first data structure causes the active configuration to be removed from the first data structure.

4. The method of claim 1, wherein causing the user specified configuration to be non-temporarily stored in the first data structure causes the new configuration to be removed from the first data structure.

5. The method of claim 1, wherein causing the new configuration to be non-temporarily stored in the first data structure causes the new configuration to persist in the first data structure after expiration of the period of time.

6. The method of claim 1, wherein receiving the first message comprises:
    receiving the first message via one of a command line interface or a remote procedure call mechanism.

7. A network device, comprising:
    one or more memories; and
    one or more processors to:
        receive a first message indicating that the network device is to operate according to a new configuration for a period of time and that the network device is to operate according to a user specified configuration upon expiration of the period of time without confirmation of the new configuration,
            wherein the first message includes at least one of:
                information identifying that the network device is to operate according to the new configuration;
                information identifying the period of time; or
                information identifying that the network device is to operate according to the user specified configuration upon expiration of the period of time without confirmation of the new configuration;
        cause, based on the first message, the new configuration to be temporarily stored in a first data structure to cause the network device to operate according to the new configuration for the period of time;
        determine, based on causing the new configuration to be stored in the first data structure, whether the network device received, prior to expiration of the period of time, a second message indicating confirmation of the new configuration; and
        selectively:
            cause the user specified configuration to be non-temporarily stored in the first data structure to cause the network device to operate according to the user specified configuration after expiration of the period of time, based on determining that the network device did not receive the second message prior to expiration of the period of time; or
            cause the new configuration to be non-temporarily stored in the first data structure to cause the network device to operate according to the new configuration after expiration of the period of time, based on determining that the network device received the second message prior to expiration of the period of time.

8. The network device of claim 7, wherein the new configuration and the user specified configuration, prior to the network device receiving the first message, are stored in a second data structure.

9. The network device of claim 7, wherein causing the new configuration to be temporarily stored in the first data structure causes an active configuration to be removed from the first data structure.

10. The network device of claim 7, wherein causing the user specified configuration to be non-temporarily stored in the first data structure causes the new configuration to be removed from the first data structure.

11. The network device of claim 7, wherein causing the new configuration to be non-temporarily stored in the first data structure causes the new configuration to persist in the first data structure after expiration of the period of time.

12. The network device of claim 7, wherein at least one of the first message or the second message is received via one of a command line interface or a remote procedure call mechanism.

13. A non-transitory computer-readable medium storing a set of instructions, the set of instructions comprising:
one or more instructions that, when executed by one or more processors of a network device, cause the network device to:
receive a first message indicating that the network device is to operate according to a new configuration for a period of time and that the network device is to operate according to another configuration upon expiration of the period of time without confirmation of the new configuration,
wherein the first message includes at least one of:
information identifying that the network device is to operate according to the new configuration;
information identifying the period of time; or
information identifying that the network device is to operate according to the other configuration upon expiration of the period of time without confirmation of the new configuration;
cause, based on the first message, the network device to operate according to the new configuration for the period of time;
determine, based on causing the network device to operate according to the new configuration for the period of time, whether the network device received, prior to expiration of the period of time, a second message indicating confirmation of the new configuration; and
selectively:
cause the network device to operate according to the other configuration after expiration of the period of time, based on determining that the network device did not receive the second message prior to expiration of the period of time; or
cause the network device to operate according to the new configuration after expiration of the period of time, based on determining that the network device received the second message prior to expiration of the period of time.

14. The non-transitory computer-readable medium of claim 13, wherein the one or more instructions, that cause the network device to operate according to the new configuration for the period of time, cause the network device to:
cause, based on the first message, the new configuration to be temporarily stored in a data structure for the period of time.

15. The non-transitory computer-readable medium of claim 14, wherein causing the new configuration to be temporarily stored in the data structure for the period of time causes an active configuration to be removed from the data structure.

16. The non-transitory computer-readable medium of claim 13, wherein the one or more instructions, that cause the network device to operate according to the other configuration after expiration of the period of time, cause the network device to:
cause the other configuration to be non-temporarily stored in a data structure after expiration of the period of time.

17. The non-transitory computer-readable medium of claim 13, wherein the one or more instructions, that cause the network device to operate according to the new configuration after expiration of the period of time, cause the network device to:
cause the new configuration to persist in a data structure after expiration of the period of time.

18. The non-transitory computer-readable medium of claim 13, wherein at least one of the first message or the second message is received via one of a command line interface or a remote procedure call mechanism.

19. The non-transitory computer-readable medium of claim 13, wherein the new configuration and the other configuration, prior to receiving the first message, were received and stored in a data structure.

20. The network device of claim 7, wherein the first data structure is a running configuration datastore of the network device.

* * * * *